(12) United States Patent
Andrade-Cetto (10) Patent No.: US 7,096,154 B1
(45) Date of Patent: Aug. 22, 2006

(54) SYSTEM AND METHOD FOR VISUALIZING REPETITIVELY STRUCTURED MARKOV MODELS

(75) Inventor: Lucio Andrade-Cetto, Boston, MA (US)

(73) Assignee: The Mathworks, Inc., Natick, MA (US)

( * ) Notice: Subject to any disclaimer, the term of this patent is extended or adjusted under 35 U.S.C. 154(b) by 98 days.

(21) Appl. No.: 10/749,770

(22) Filed: Dec. 30, 2003

(51) Int. Cl.
*G06F 11/30* (2006.01)
*G06F 19/00* (2006.01)

(52) U.S. Cl. ...................................... 702/181; 182/188
(58) Field of Classification Search .................. 702/19, 702/150, 152, 155, 181, 182, 188; 382/219, 382/228; 704/243, 246, 256; 435/6
See application file for complete search history.

(56) References Cited

U.S. PATENT DOCUMENTS

| | | | |
|---|---|---|---|
| 6,493,637 B1 * | 12/2002 | Steeg | 702/19 |
| 2002/0146724 A1 * | 10/2002 | Toll et al. | 435/6 |
| 2004/0176879 A1 * | 9/2004 | Menon et al. | 701/1 |

\* cited by examiner

*Primary Examiner*—Bryan Bui (57) ABSTRACT

A method of displaying the probabilities associated with a Markov model as a series of interactive plots is disclosed. Three dimensions of probability data associated with a Markov model are presented to a user in a concise manner. Heat maps are used to display probability data from a Markov model so that the user can identify and understand hidden patterns and information in the data such as state and emission transitions which are not possible to see with conventional state diagram plots.

37 Claims, 7 Drawing Sheets

SYSTEM AND METHOD FOR VISUALIZING REPETITIVELY STRUCTURED MARKOV MODELS

FIELD OF THE INVENTION

The illustrative embodiment of the present invention relates generally to the modeling of systems using Markov models and more particularly to the display of probabilities associated with Markov models.

BACKGROUND

A Markov model is a common statistical tool for modeling structured processes or phenomena that include randomness in both the output and the state of the process. Such models are used in many fields including in computational biology for modeling of protein family sequences, in speech recognition and in financial modeling. Markov models are generally represented by state diagrams showing both the emission probabilities and the transition probabilities of the system being modeled. Emission probabilities show the probabilities of certain outputs. Transition probabilities are the probabilities of changing the state of the model. State diagrams are useful for visualizing the architecture of the model and for seeing how the model can transition from one state to another. If the identity of the state itself is hidden from an outside observer, the Markov model is said to be a Hidden Markov model.

Unfortunately state diagrams do not represent an ideal method of conveying probability information from a Markov model to a user. Where there are a large number of states in the system being modeled, the state diagram may become confusing. Additionally, the state diagram may become too large to quickly provide information at a glance to a user as it may require several pages/display screens to display all of the states.

Figure 1:
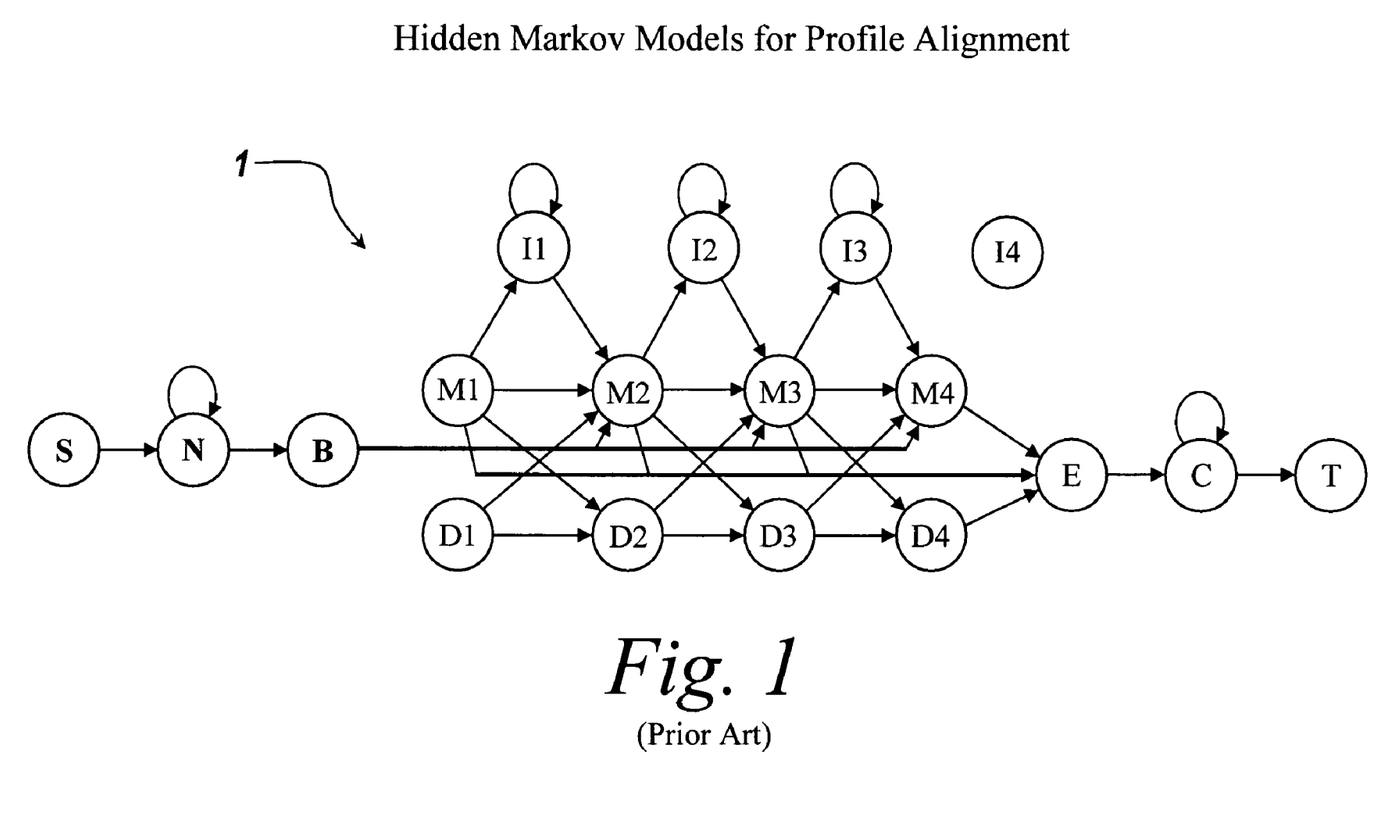
FIG. 1 (prior art) depicts a state diagram of a Hidden Markov model.

FIG. 1 depicts a state diagram 1 of a Hidden Markov model being used in profile alignment of amino acid sequences from a protein family. The circles represent states and the arrows represent state transitions. As the size of the state diagram grows, the transitions become more difficult to follow and represent in a concise manner to a user. For large models with a repetitive architecture, it is less important to see the representation of the architecture than it is to understand the changes in the emission and transition probabilities throughout the model.

SUMMARY OF THE INVENTION

The illustrative embodiment of the present invention provides a method of displaying the probabilities associated with a Markov model as a series of interactive plots. The Markov model may be an ordinary Markov model or a Hidden Markov model. Three dimensions of probability data associated with a Markov model are presented to a user in a concise manner. Heat maps are used to display probability data from a Markov model so that the user can identify and understand hidden patterns and information in the data such as state and emission transitions which are not possible to see with a state diagram plot.

In one embodiment, in an electronic device, a method provides a Markov model data structure for a system being modeled. The Markov model data structure is then populated with probability data for the system being modeled. The probability data from the Markov model is then displayed in three dimensions to a user.

In another embodiment in an electronic device, a system includes a Markov model visualization process. The Markov model visualization process includes a probability-determining algorithm that determines the probabilities of the occurrence of events in a system being modeled with a Markov model. The Markov model visualization process also includes a visualization function which displays the Markov model probabilities with three dimensions of data. The system also includes a storage location that is interfaced with the electronic device. The storage location holds data regarding the components of the system being modeled. The system additionally includes a display device interfaced with the electronic device which is used to display the three dimensions of data to a user.

DETAILED DESCRIPTION

The illustrative embodiment of the present invention provides a plot for visualization of the probabilistic structure of a repetitive Markov model. The Markov model probability space plot graphically represents the probability space of a repetitively structured Markov model in a three-dimensional space. For example, model state may be displayed along the first dimension, output probability field may be displayed along the second dimension, and a probability measure (after proper scaling) may be displayed in the third dimension and represented with a color indicative of intensity so that the data forms a heat map. The output probability field may be either a symbol emission mass distribution function (MDF) at every state, or, a transition MDF probability at every state. The scaling of probabilities may be plain probabilities, log-probabilities or log-odds. Log-odds probabilities compute the ratio between the observed model probabilities and a background probability. The log-odds probability is used to determine whether events are more or less likely than a predefined distribution (background probability). The background probability helps to localize events and/or patterns that are of meaningful physical/biological importance. Alternatively the probabilities may be scaled using a non-contiguous scale. A non-contiguous scale thresholds the probability data only displaying a discrete subset of the data based on selected parameters.

Those skilled in the art will recognize that other methods of depicting the probability data for a user may be used to display the data such as the use of grayscale images. Similarly, the color itself may indicate the probability measure value and graphical indicators other than intensity may be used without departing from the scope of the present invention.

Figure 2:
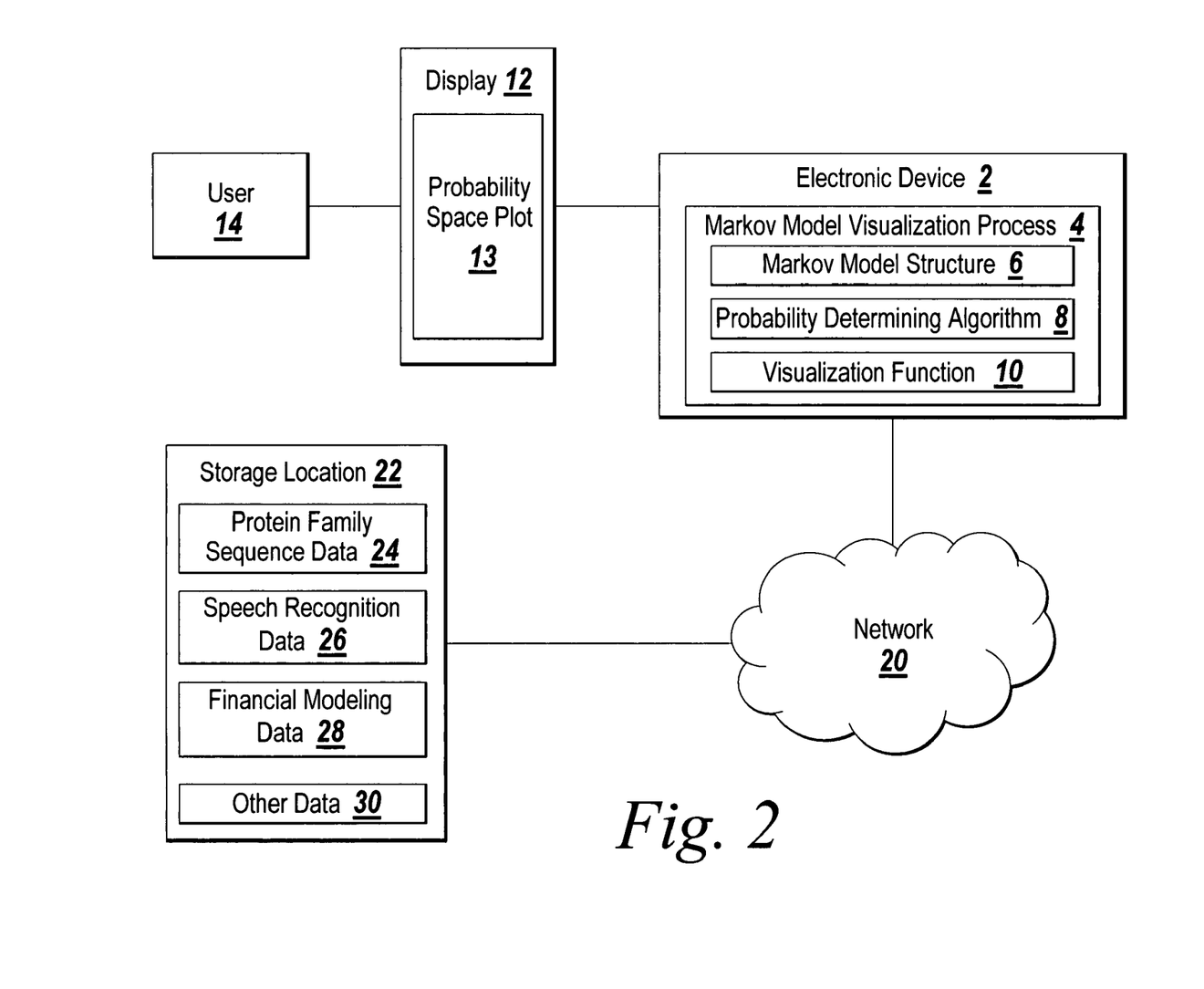
FIG. 2 depicts an environment suitable for practicing the illustrative embodiment of the present invention.

FIG. 2 depicts an environment suitable for practicing the illustrative embodiment of the present invention. An electronic device 2 holds a Markov model visualization process 4. The Markov model visualization process 4 includes a Markov model structure 6, a probability determining algorithm 8 and a visualization function 10. The Markov model structure 6 includes fields containing arrays of probability information for the various components of the model. The probability information that is held by the Markov model structure 6 may be previously known or may be estimated by the probability determining algorithm 8 that estimates the probabilities of the occurrence of certain events within the system being modeled and then stores the probabilities in the fields of the Markov model structure.

For example, in the case of protein family modeling or speech recognition there are well-known model architectures. The user must assign transition and emission probabilities to the model. If prior information about the probabilities of transitions or emissions is known, it can be directly assigned. Usually however, it is more common to not know the probabilities associated with the system being modeled with the result that model training is required to estimate probabilities. The probability-determining algorithm 8 may be a well-known algorithm such as the Baum-Welch algorithm Viterbi training algorithm or the Expectation Maximization (EM) algorithm, a lesser-known algorithm or a custom designed algorithm.

The electronic device 2 may be connected to a network 20 which is interfaced with a storage location 22. The electronic device 2 may be a server, workstation, laptop, PDA or some other type of electronic device equipped with a processor and capable of executing the Markov model visualization process 4. The network 20 may be the Internet, an intranet, a Local Area Network (LAN), a Wide Area Network, (WAN), or some other type of network. The storage location 22, such as a database, holds data related to the model of the system being modeled by the Markov model. The storage location 22 may hold protein family sequence data 24, speech recognition data 26, financial modeling data 28, or some other type of data 30. The electronic device 2 is interfaced with a display 12 viewed by a user 14. The display 12 is used to display a probability space plot 13 generated by the visualization function 10 of the Markov model visualization process 4. The input to the visualization function 10 is the Markov model structure 6 with fields containing arrays of probability information for the various components of the model. The probability space plot 13 displays three dimensions of probability data from the Markov model structure 6.

Those skilled in the art will recognize that the various components of the environment depicted in FIG. 2 may appear in alternate configurations. For example, the modules of the Markov model visualization process 4 may be located remotely from each other. Similarly, the storage location 22 may be located on the electronic device 2.

Figure 3:
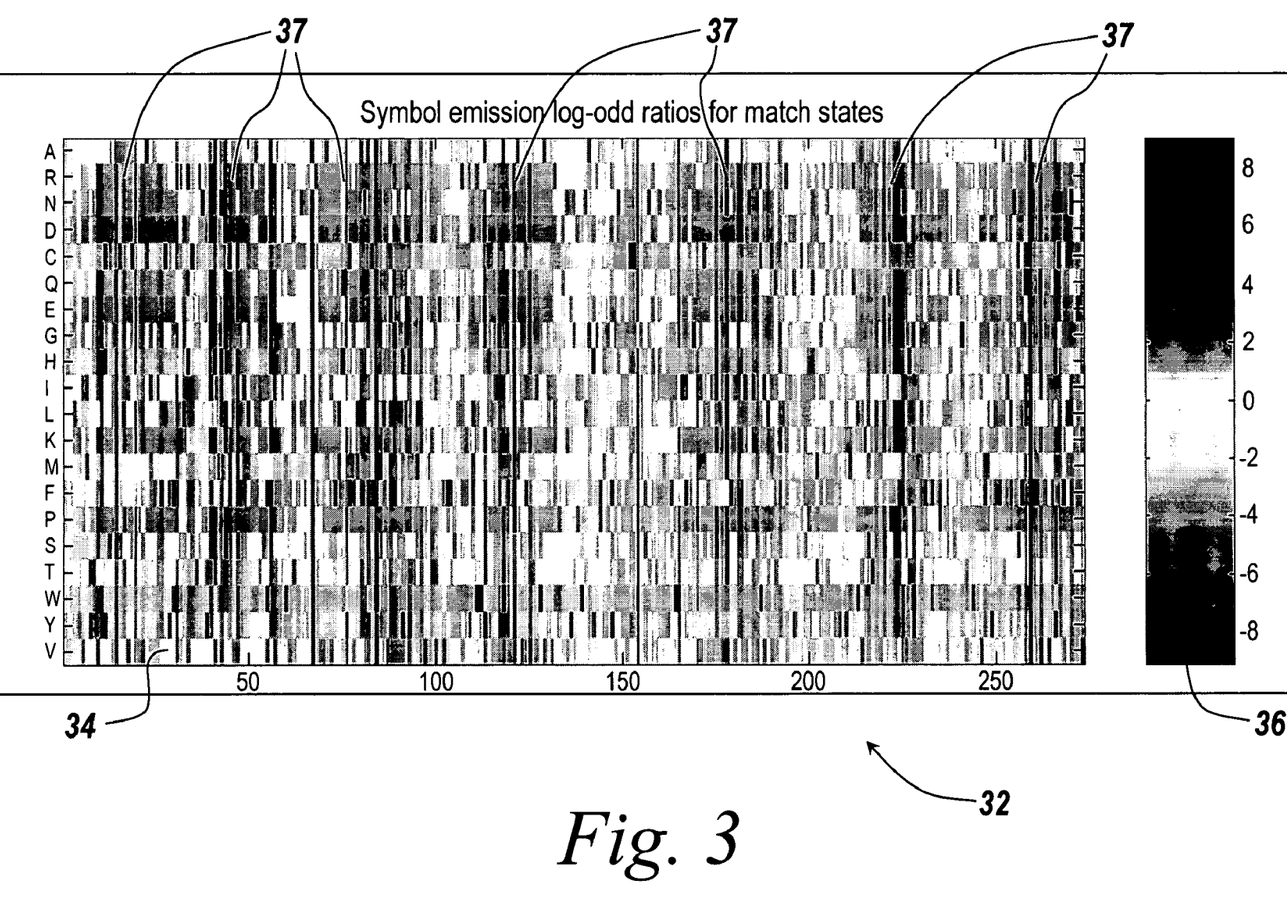
FIG. 3 depicts log-odds ratio values in the probability space plot.

The illustrative embodiment of the present invention displays heat maps of each of the probability data arrays 6 held by the Markov model structure. The heat maps are interactive in that they allow the user to click on the plots to show either the particular value at a point on the plot or to show the profile for the state of the selected point. FIG. 3 depicts a heat map 32 generated by the illustrative embodiment of the present invention for a protein family modeled as a Markov model. The heat map 32 includes two views 34 and 36. The left view 34 displays data in three dimensions. The X axis represents model states (positions in a protein sequence), the Y axis represents output probability fields (particular amino acids), and a third dimension of data is shown at the interior points as scaled probability measures with the color indicating intensity of the value. The right hand view 36 depicts an intensity bar which may be colored to correspond to the displayed colors found within the left hand view. For example, a red value may show that a particular amino acid is more likely to appear at a particular place in the protein sequence of a member of this protein family. Likewise, a green color may indicate a low probability of a particular amino acid appearing at a particular spot in a protein sequence. Those skilled in the art will recognize that the data contained in the Markov model may be further filtered prior to display such that only a subset of the Markov model data is displayed to a user.

The values depicted in FIG. 3 are scaled log-odd ratios which adjusts the display to indicate that certain symbols (at a given state) may be more likely to occur in the background probability. The color used at that location to reflect the expectation is a designated color such as white which serves to indicate that the symbol is expected to appear with the same probability as the background probability and so does not have great analysis significance. This use of intensity values allows a user 14 to see at a glance particular features of interest in a model. For example, in FIG. 3, the seven hydrophobic domains 37 of the 7-transmembrane receptor protein family can be distinguished in the profile. This type of information is useful to bioinformaticians as it may lead to better understand the protein folding behavior of amino acid sequences. It should be understood that the present invention in an alternate implementation may also be used to display model data not based on a Markov model using the visualization techniques discussed herein.

Figure 4:
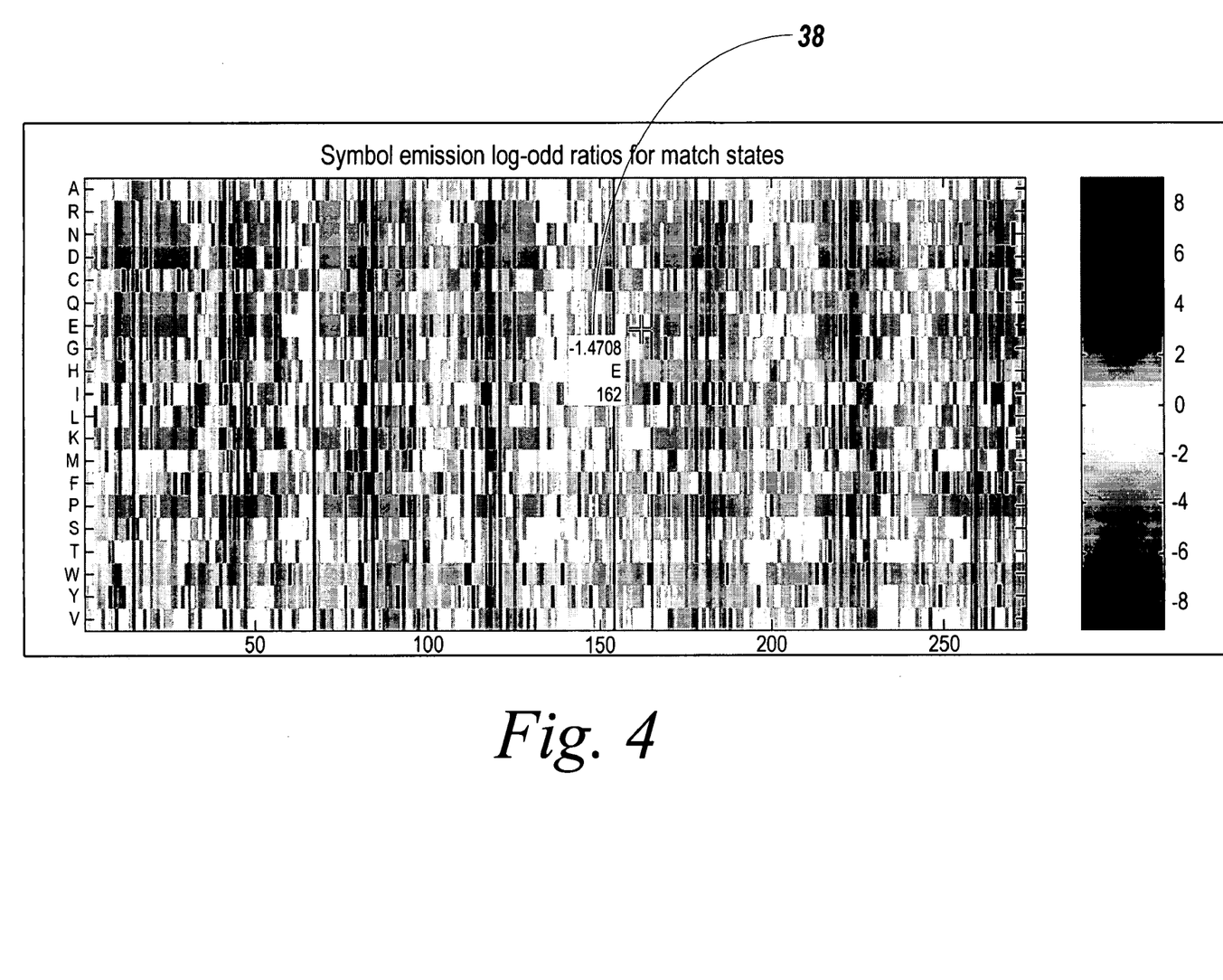
FIG. 4 demonstrates an interactive feature of the illustrative embodiment of the present invention in the display of an exact probability value for an emission and position in the sequence of FIG. 4.

The illustrative embodiment of the present invention also provides interactive feedback to the user 14 through the heatmap. FIG. 4 depicts the interactive process used to display a state probability value to a user for a specified field. A displayed value 38 is generated showing the symbol emission log-odds ratio value (−1.4708) for the user-selected state (state 162) at a particular probability field (field E).

Figure 5:
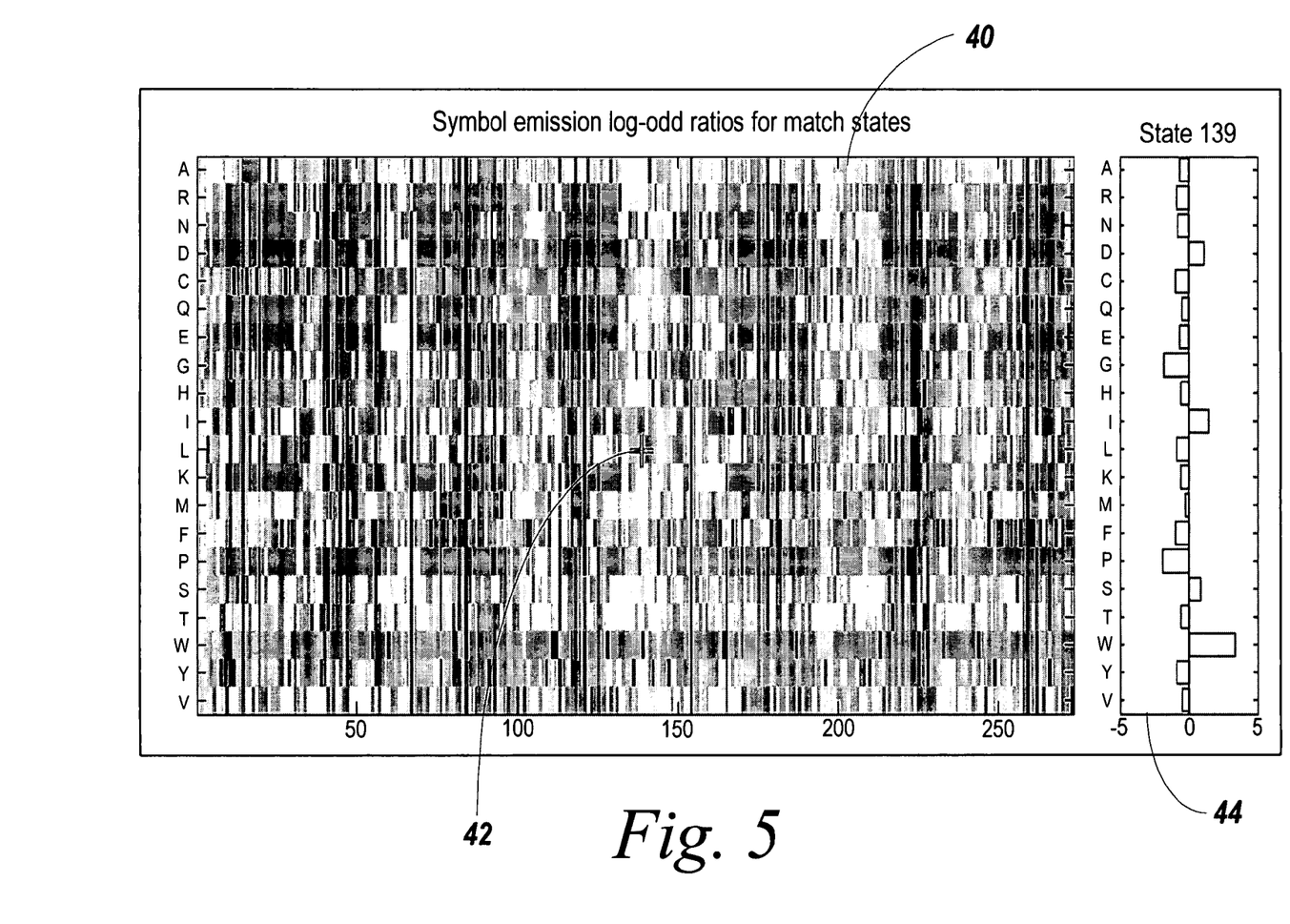
FIG. 5 demonstrates the display of log-odd ratios for a selected state.

The Markov model probability data may also be displayed to a user by using a view to display the scaled probability data for all of the probability fields for a selected state. FIG. 5 depicts a heat map 40 generated by the illustrative embodiment of the present invention. A user-selected state (state 139) is indicated with a cursor 42. The right hand view replaces the intensity bar shown in FIG. 3 and FIG. 4 with a bar chart 44 representing the log-odds ratios for each of the amino acids at the selected state 139 of the protein sequence being modeled.

Figure 6:
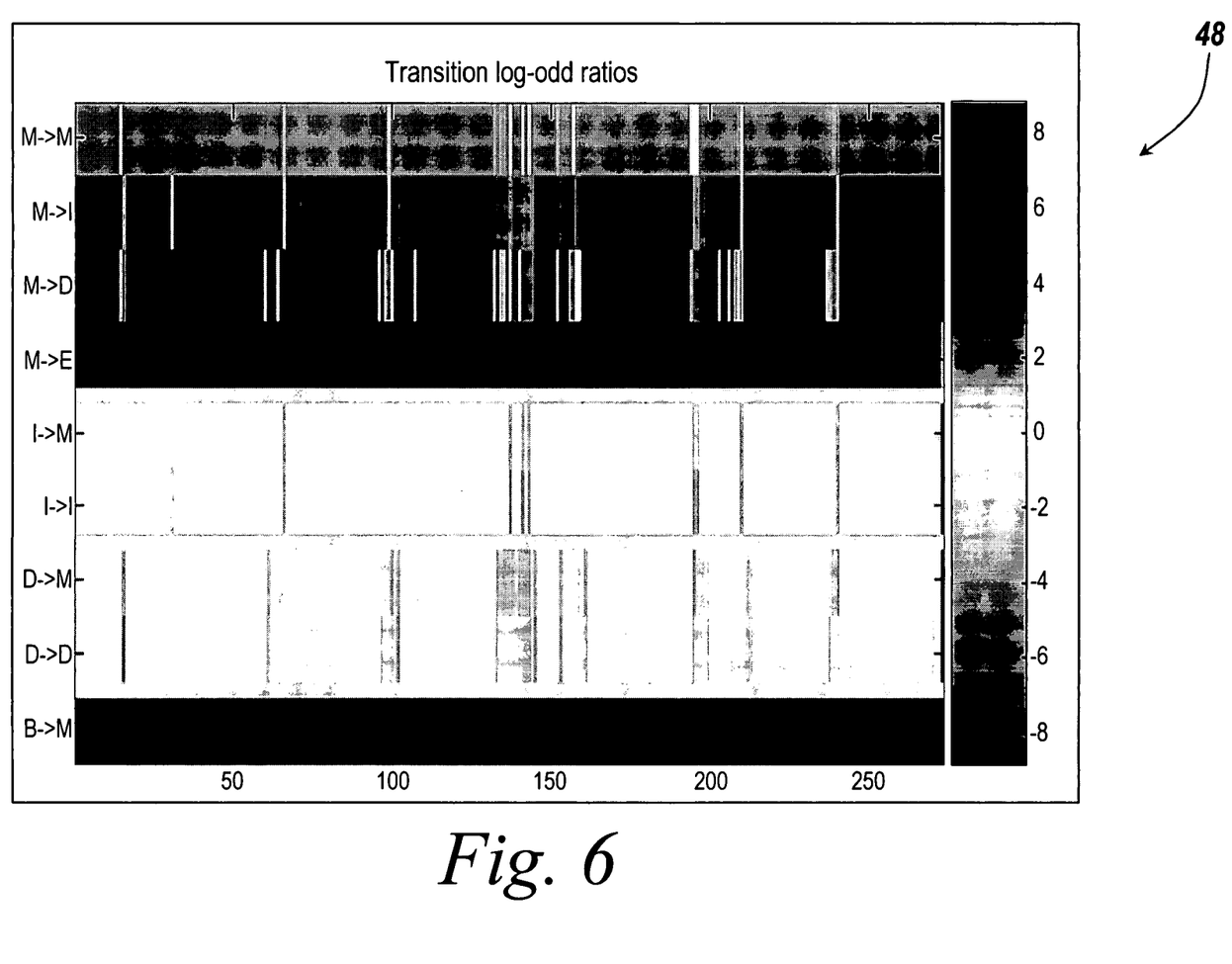
FIG. 6 depicts the display of transition log-odd ratios for from a Markov model.

In addition to state emission values, the Markov model structure 6 may also hold probability data relating to state transitions which may be presented to a user. FIG. 6 depicts a view 48 of the state transition log-odds ratios generated by the illustrated embodiment of the present invention. The odds of transitioning from one amino acid to another at various points in a protein sequence are shown. The view 48 and other views generated by the illustrative embodiment of the present invention may display regions of the model where sections of the succession of states are likely to have insertions or deletions (indels). In the case of molecular biology; the understanding of indels provides evolutionary and functional information of genomic sequences.

The protein family being modeled is represented with a Markov model structure 6 by the illustrative embodiment of the present invention. The protein family of FIG. 3, FIG. 4, FIG. 5 and FIG. 6 may be represented as follows in the Markov model structure:

Name: '7tm_2'

PfamAccessionNumber: 'PF00002'

ModelDescription: '7 transmembrane receptor (Secretin family)'

ModelLength: 273

Alphabet: 'AA'

MatchEmission: [273×20 probability matrix]

InsertEmission: [273×20 probability matrix]

NullEmission: [1×20 probability matrix]

BeginX: [274×1 probability matrix]

MatchX: [272×4 probability matrix]

InsertX: [272×2 probability matrix]

DeleteX: [272×2 probability matrix]

FlankingInsertX: [2×2 probability matrix]

Figure 7:
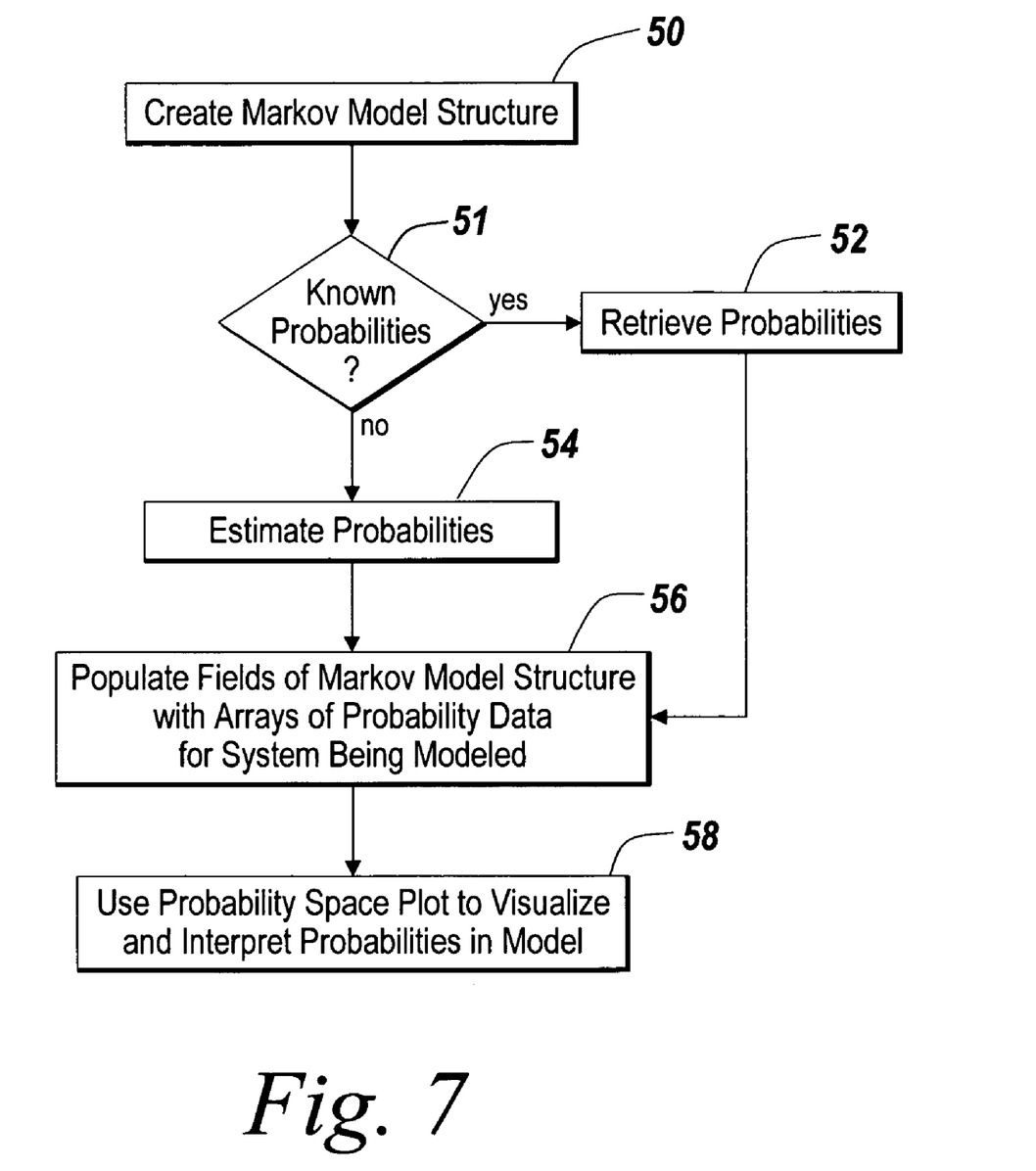
FIG. 7 is a flowchart of the sequence of steps followed by the illustrative embodiment of the present invention to display probability data based on a Markov model.

The overall sequence of steps followed by the illustrative embodiment of the present invention to display Markov model probability data is depicted in the flowchart of FIG. 7. The sequence begins when a Markov model structure 6 appropriate for the system being modeled is created or provided (step 50). It should be understood that in some circumstances appropriate Markov model structures 6 may already exist and may be used without creating a new structure. The Markov model structure 6 may be for a regular or Hidden Markov model. A determination is then made (step 51) as to whether the probabilities associated with the system are already known. If the probabilities associated with the system are known, they are retrieved (step 52). If the probabilities are not known for the system, the probabilities are estimated (step 54). The probabilities may be estimated based on a well-known algorithm or based on a lesser-known or custom designed algorithm. Once the probabilities are available, either by being retrieved or estimated, the fields of the Markov model structure 6 are populated with arrays of probability data (step 56). The visualization function 10 then uses the arrays of probability data in the Markov model structure 6 to generate a probability space plot 13 displaying the data in three dimensions (step 58). The visualization function may also optionally display the probability data using a non-contiguous scale with user-selected threshold parameters (step 60).

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention and data structures other than the ones mentioned herein may be used to hold data without departing from the scope of the present invention.

The invention claimed is:

1. In an electronic device, a data visualization method comprising the steps of:
    providing a data structure holding a representation of a Markov model for a system being modeled;
    populating said Markov model data structure with at least one of transition probability data and emission probability data for the system being modeled; and
    displaying more than one dimension of said probability data from said Markov model in a heat map.

2. The method of claim 1 wherein said Markov model data structure is a Hidden Markov model data structure.

3. The method of claim 1 wherein a probability measure is displayed in color.

4. The method of claim 1 wherein a probability measure is displayed in grayscale.

5. The method of claim 1 wherein a probability measure is displayed graphically.

6. The method of claim 1 wherein said system being modeled is a protein family sequence.

7. The method of claim 1 wherein said system being modeled is one of a speech recognition system and a financial modeling system.

8. The method of claim 1, comprising the further step of:
    displaying a model state along a first dimension, an output probability field along a second dimension, and a probability measure as a third dimension.

9. The method of claim 8 wherein said probability measure is scaled using one of plain probabilities, log-probabilities and log-odds ratios probabilities.

10. The method of claim 9 wherein the scale is non-contiguous.

11. The method of claim 8 wherein said output probability field is one of a symbol emission mass distribution function at every state and transition mass distribution function at every state.

12. The method of claim 8 wherein every state in said model is displayed.

13. The method of claim 1 wherein only a portion of said probability data is displayed.

14. The method of claim 1, comprising the further steps of:
    estimating programmatically said probability data prior to displaying said probability data.

15. The method of claim 14 wherein at least one of the Baum-Welch algorithm, Viterbi training algorithm, (Expectation Maximization) EM algorithm, and custom algorithm are used to estimate said probability data.

16. The method of claim 1 wherein said probability data is displayed in a heat map and comprising the further step of:
    displaying an exact value of a probability measure in response to a user input.

17. In an electronic device, a system, comprising:
    a Markov model visualization process, said Markov model visualization process including a probability determining algorithm and a visualization function, said probability determining algorithm determining the probabilities of the occurrence of events in a system being modeled with a Markov model, said visualization function displaying the Markov model probabilities with three dimensions of data;
    a storage location holding data for components of said system being modeled;
    a display device interfaced with said electronic device, said display device displaying said three dimensions of data in a heat map to a user.

18. The system of claim 17 wherein the three dimensions of data are at least one model state, at least one output probability field, and at least one probability measure after scaling.

19. The system of claim 18 wherein said at least one probability measure after scaling is at least one of plain probabilities, log-probabilities and log-odds ratios probabilities.

20. The system of claim 18 wherein said output probability field is one of a symbol emission mass distribution function at every state and transition mass distribution function at every state.

21. The system of claim 17 wherein the system being modeled by the Markov model is a protein family.

22. A medium holding computer-executable instructions for a data visualization method, said instructions comprising:
   instructions for providing a data structure holding a representation of a Markov model for a system being modeled;
   instructions for populating said Markov model data structure with at least one of transition probability data and emission probability data for the system being modeled; and
   instructions for displaying more than one dimension of said probability data from said Markov model in a heat map.

23. The medium of claim 22 wherein said Markov model data structure is a Hidden Markov model data structure.

24. The medium of claim 22 wherein a probability measure is displayed in color.

25. The medium of claim 22 wherein a probability measure is displayed in grayscale.

26. The medium of claim 22 wherein a probability measure is displayed graphically.

27. The medium of claim 22 wherein said system being modeled is a protein family sequence.

28. The medium of claim 22 wherein said system being modeled is one of a speech recognition system and a financial modeling system.

29. The medium of claim 22, wherein the instructions further comprise:
   instructions for displaying a model state along a first dimension, an output probability field along a second dimension, and a probability measure as a third dimension.

30. The medium of claim 29 wherein said probability measure is scaled using one of plain probabilities, log-probabilities and log-odds ratios probabilities.

31. The medium of claim 30 wherein the scale is non-contiguous.

32. The medium of claim 29 wherein said output probability field is one of a symbol emission mass distribution function at every state and transition mass distribution function at every state.

33. The medium of claim 22 wherein every state in said model is displayed.

34. The medium of claim 22 wherein only a portion of said probability data is displayed.

35. The medium of claim 22, wherein said instructions further comprise:
   instructions for estimating programmatically said probability data prior to displaying said probability data.

36. The medium of claim 35 wherein at least one of the Baum-Welch algorithm, Viterbi training algorithm, (Expectation Maximization) EM algorithm, and custom algorithm are used to estimate said probability data.

37. The medium of claim 22 wherein said probability data is displayed in a heat map and the instructions further comprise:
   instructions for displaying an exact value of a probability measure in response to a user input.

* * * * *